United States Patent [19]

Horowitz

[11] 4,096,884
[45] Jun. 27, 1978

[54] RELAY VALVE

[75] Inventor: Charles Horowitz, Niles, Ill.

[73] Assignee: Sloan Valve Company, Franklin Park, Ill.

[21] Appl. No.: 752,131

[22] Filed: Dec. 20, 1976

[51] Int. Cl.² ............................................. F16K 11/16
[52] U.S. Cl. ........................... 137/627.5; 251/DIG. 1; 303/40; 303/56
[58] Field of Search .............. 137/627.5; 251/DIG. 1; 303/40, 56

[56] References Cited

U.S. PATENT DOCUMENTS

| | | | |
|---|---|---|---|
| 3,934,942 | 1/1976 | Klimek | 303/40 X |
| 3,945,689 | 3/1976 | Masuda et al. | 303/40 X |

*Primary Examiner*—Robert G. Nilson
*Attorney, Agent, or Firm*—Kinzer, Pyler, Dorn & McEachran

[57] ABSTRACT

A relay valve for use in vehicle air brake systems has a housing with a service port, supply port, delivery ports and an exhaust port. A piston and shuttle are movable within the housing to control communication between the ports. The shuttle carries a seal member which, in the closed position, is in sealing relation with both the piston and the housing, thereby closing communication between the supply and delivery ports and between the delivery and exhaust ports. There are means to vent pressure buildup behind the shuttle seal thereby preventing accidental blowout of the seal.

8 Claims, 3 Drawing Figures

U.S. Patent   June 27, 1978   4,096,884
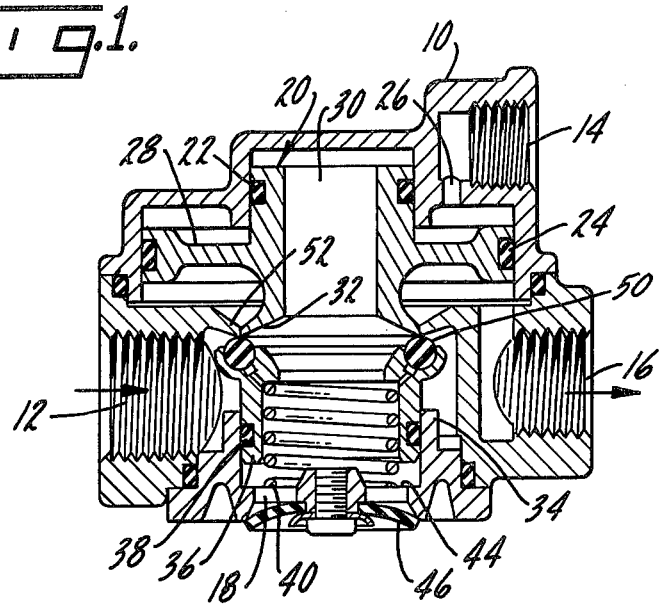
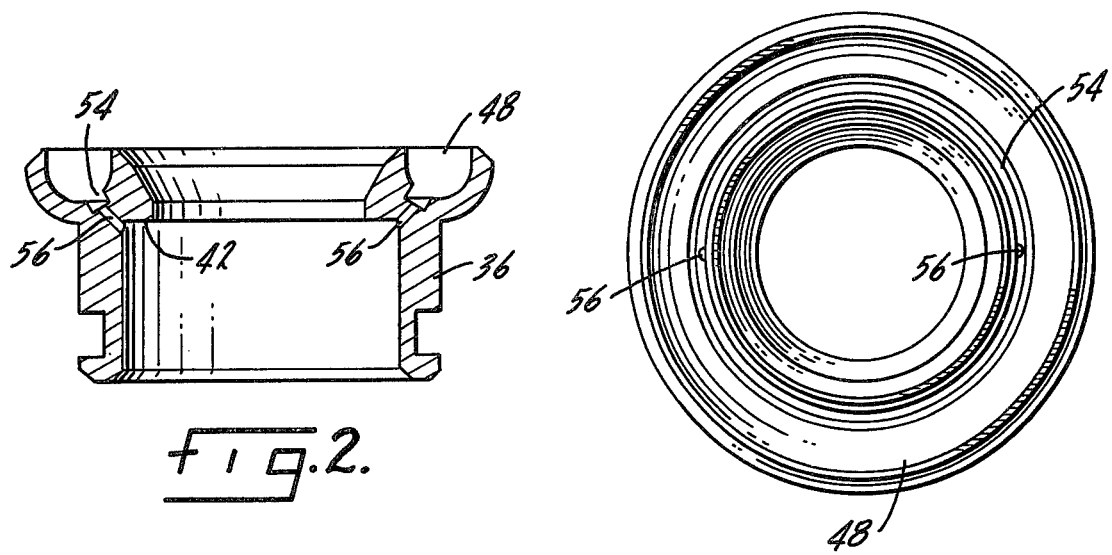

RELAY VALVE

SUMMARY OF THE INVENTION

The present invention relates to relay valves for use in vehicle air brake systems and has particular reference to a simply constructed reliably operable valve of the type described.

A primary purpose of the invention is a relay valve in which a shuttle carried seal is in sealing engagement with both the valve piston and valve housing.

Another purpose is a valve of the type described in which the shuttle seal performs a double sealing function.

Another purpose is a relay valve of the type described including means for venting pressure buildup behind the shuttle seal preventing blowout of the seal.

Another purpose is a relay valve in which a single seal controls communication between supply and delivery ports and between delivery and exhaust ports.

Other purposes will appear in the ensuing specification, drawings and claims.

BRIEF DESCRIPTION OF THE DRAWINGS

The invention is illustrated diagrammatically in the following drawings wherein:

FIG. 1 is an axial section through a relay valve of the type described,

FIG. 2 is an enlarged axial section through the valve shuttle, and

FIG. 3 is a top plan view of the valve shuttle.

DESCRIPTION OF THE PREFERRED EMBODIMENT

Relay valves of the type described are used in vehicle air brake systems and are responsive to an air signal caused by the vehicle operator's foot pedal to control communication between the supply port, connected to the vehicle air system, and the valve delivery ports which are connected to the vehicle air brakes. The relay valve will provide pressure at the delivery ports in accordance with the air signal provided at the service port. Although the ratio between the pressure of the air signal and the pressure at the delivery ports may vary for different valves, in the present arrangement it is desirable, although not essential, that there be a 1:1 ratio between these pressures. Thus, pressure at the delivery port will essentially follow the pressure provided by the air signal at the service port.

In FIG. 1 a housing 10 may have a supply port 12, a service port 14, a pair of delivery ports, one of which is indicated at 16, and an exhaust port 18. Positioned within the chamber formed by housing 10 is a piston 20 carrying an upper seal ring 22 in sealing engagement with a portion of housing 10 and a seal ring 24 of greater diameter in sealing relation with a further portion of housing 10. There is a small passage 26 in housing 10 which places service port 14 in communication with upper surface 28 of piston 20. Piston 20 may have a generally central bore 30 and an outwardly-flared lower lip 32 which forms a sealing surface as will be described hereinafter.

An upstanding boss 34, forming a part of housing 10, may form an annular surface for guiding shuttle 36. The shuttle may have a seal ring 38 in sealing engagement with boss 34 and may be urged toward the position of FIG. 1 by a coil spring 40, the upper end of which is seated against a shoulder 42 on the shuttle. The lower end of spring 40 may be seated upon an annular surface 44 at the lower end of boss 34.

A conventional flapper valve 46 controls the opening and closing of exhaust port 18.

The upper end of shuttle 36 has an annular groove 48 which receives an O-ring seal 50. As clearly shown in FIG. 1, seal 50 is positioned for sealing engagement with piston sealing lip 32 and with the lower interior end of housing sealing surface 52. The housing and piston sealing surfaces 52 and 32 have only slightly different interior and exterior diameters such that the sealing surfaces are closely adjacent each other when in sealing engagement with the same sealing surface, that is, O-ring 50. Thus, seal 50 performs a dual sealing function and is in sealing engagement with both the piston and the housing when the valve is in the closed position of FIG. 1.

A vent groove 54 is formed at the bottom end of seal groove 48 and there may be a plurality of small passages 56 connecting vent groove 54 with the interior of the shuttle and thus with exhaust port 18.

In operation, when the valve is in the position shown, no air is being delivered from supply port 12, which is connected to the vehicle air system, through delivery ports 16 to the air brakes. When the driver applies the brake pedal, an air signal proportional to the pressure from the vehicle operator's foot is provided at port 14 and, through passage 26, will cause piston 20 to move in a downward direction. The shuttle will move downward with the piston and the seal between surface 32 and seal ring 50 will be initially maintained. However the seal between surface 52 and seal 50 will be broken and air at supply port 12 will be delivered to ports 16. The amount of pressure supplied at delivery ports 16 from supply port 12 will be directly proportional to the air signal at port 14. The downward pressure on surface 28 of piston 20 will be balanced by upwardly-directed pressure on the bottom surface of the piston and by the small pressure exerted by shuttle spring 40. The piston will be maintained in this balanced condition as long as the air signal at service port 14 balances the air supplied through delivery ports 16. A drop in pressure at port 14 will cause the piston to move upwardly with the result that the seal between piston sealing surface 32 and seal ring 50 will be broken providing communication between exhaust port 18 and delivery ports 16. The pressures on the piston will again equalize with the result that the shuttle will close upon the piston. In this way, variations in pressure supplied at port 14 will cause piston 30 and the shuttle to modulate the amount of air supplied from port 12 to delivery ports 16. Thus, the relay valve will provide an application of braking pressure in accordance with the operation of the brake pedal by the vehicle operator.

At such time as the brakes are released, piston 20 will move back toward the position of FIG. 1. The shuttle will close upon housing sealing surface 52, but will not close upon the piston, thus, permitting pressure from delivery ports 16 to be exhausted through the center of the shuttle and out exhaust port 18.

Of particular importance is the fact that a standard O-ring, seal 50, is arranged to provide a double sealing function. It both seals or closes communication between supply port 12 and delivery ports 16, as well as closing communication between delivery ports 16 and exhaust port 18. Thus, a single standard seal member, appropriately positioned relative to the housing and the piston, is effective to be in sealing engagement with both such elements.

A further important feature is the vent means behind seal 50. At times it is possible for pressure to seep behind an O-ring and if this pressure builds up to a significant level it can cause the seal ring to pop out, thus completely eliminating any seal or closure within the relay valve. A small annular groove is positioned behind the seal ring and there are passages connecting the vent groove with the exhaust port. Thus, any pressure which would normally build up behind the seal ring is vented to exhaust, eliminating the possibility of the seal ring being blown out by such pressure.

The outer diameter of seal 50 is slightly greater than the outer diameter of seal 38. Thus, pressure at supply port 12 will normally provide a small closing force for the shuttle to assist the force of spring 40.

Whereas the preferred form of the invention has been shown and described herein, it should be realized that there may be many modifications, substitutions and alterations thereto.

The embodiments of the invention in which an exclusive property or privilege is claimed are defined as follows:

1. A relay valve for use in vehicle air brake systems including a housing having a service port, a supply port, at least one delivery port, and an exhaust port, a piston movable in said housing in response to pressure at said service port to control communication between said supply and delivery ports, a shuttle movable in said housing to control communication between said exhaust and delivery ports, said shuttle having a groove and a seal positioned in said shuttle groove, sealing surfaces on said piston and housing, spring means urging said shuttle seal into sealing engagement with said piston and housing sealing surfaces thereby closing communication between said supply and delivery ports and between exhaust and delivery ports, and vent means connecting said shuttle seal groove and said exhaust port, to prevent pressure buildup behind said shuttle seal.

2. The structure of claim 1 further characterized in that said shuttle seal is annular, with said piston and housing sealing surfaces being annular, said piston sealing surface being in contact with said seal concentrically with and inside of said housing sealing surface.

3. The structure of claim 2 further characterized in that said shuttle seal is in the form of a ring.

4. The structure of claim 2 further characterized in that the outer diameter of said piston sealing surface is slightly smaller than the inside diameter of said housing sealing surface, with said sealing surfaces being in contact with said shuttle seal, when in the closed position, at closely spaced points upon said seal.

5. The structure of claim 4 further characterized in that said piston and housing sealing surfaces are in the form of annular lips.

6. The structure of claim 1 further characterized in that said vent means includes an annular vent groove opening into said shuttle seal groove and a plurality of passages connecting said vent groove with the interior of said shuttle.

7. The structure of claim 1 further characterized by and including seal means carried by said shuttle and in sealing engagement with a further portion of said housing, said last-named seal means being concentric with but having an outer diameter less than said first-named shuttle seal whereby said difference in diameters creates a pressure force directing said shuttle toward the described closed position.

8. The structure of claim 1 further characterized in that said piston and shuttle are coaxially aligned, said shuttle seal being annular in configuration and being coaxial with said piston and shuttle.

* * * * *